US009648539B1

(12) United States Patent
Hou et al.

(10) Patent No.: US 9,648,539 B1
(45) Date of Patent: May 9, 2017

(54) BASE STATION SELECTION IN ULTRA DENSE NETWORK HANDOVER SCENARIOS

(71) Applicant: Hong Kong Applied Science and Technology Research Institute Company Limited, Hong Kong (HK)

(72) Inventors: Yun Hou, Hong Kong (HK); Man Wai Kwan, Hon Kong (HK); Eddy Chiu, Hong Kong (HK); Kong Chau Tsang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 0 days.

(21) Appl. No.: 15/059,319

(22) Filed: Mar. 3, 2016

(51) Int. Cl.
   H04W 36/00 (2009.01)
   H04W 36/30 (2009.01)
   H04W 36/08 (2009.01)
   H04W 72/04 (2009.01)
   H04W 36/04 (2009.01)
   H04W 36/32 (2009.01)
   H04W 84/04 (2009.01)

(52) U.S. Cl.
   CPC ....... *H04W 36/30* (2013.01); *H04W 36/0061* (2013.01); *H04W 36/04* (2013.01); *H04W 36/08* (2013.01); *H04W 36/32* (2013.01); *H04W 72/042* (2013.01); *H04W 72/0413* (2013.01); *H04W 84/042* (2013.01)

(58) Field of Classification Search
   CPC .................. H04W 36/0061; H04W 84/042
   USPC .......................... 455/437, 436, 442; 370/331
   See application file for complete search history.

(56) References Cited

U.S. PATENT DOCUMENTS 8,265,039 B2   9/2012   Reza et al.
8,934,906 B2   1/2015   Pan et al.
(Continued)

FOREIGN PATENT DOCUMENTS

CN   1889770       1/2007
CN   103369607 A  10/2013

OTHER PUBLICATIONS

International Search Report of the related PCT application, mailed on Nov. 25, 2016.

*Primary Examiner* — Nghi H Ly
(74) *Attorney, Agent, or Firm* — Spruson & Ferguson (Hong Kong) Limited

(57) ABSTRACT

For an ultra dense network (UDN) having small cells of highly overlapped coverages, a user equipment (UE) selects in a handover process a preferred base station (BS) from candidate BSs for minimizing occurrence of handover events. The UE computes finite differences consisting of a first-, a second-, and one or more higher-order differences, according to received signal strength (RSS) values obtained for each candidate BS. A preference level, which is a total number of finite differences having consecutive order numbers, including the first-order difference, and being positive or non-negative, is computed for each candidate BS. One or more favorable candidate BSs from the candidate BSs are identified such that the group of such favorable candidate BSs has the same preference level that is maximum among all the preference levels computed for the candidate BSs. The preferred BS is selected from the group of such favorable candidate BSs.

20 Claims, 7 Drawing Sheets

(56) References Cited

U.S. PATENT DOCUMENTS

| | | | | |
|---|---|---|---|---|
| 2004/0077349 A1* | 4/2004 | Barak | ................... | H04W 36/08 |
| | | | | 455/436 |
| 2005/0233746 A1* | 10/2005 | Laroia | .................... | H04B 1/005 |
| | | | | 455/436 |
| 2007/0032241 A1* | 2/2007 | Busch | .................... | H04B 7/022 |
| | | | | 455/450 |
| 2009/0303891 A1 | 12/2009 | Lucas et al. | | |
| 2010/0130211 A1 | 5/2010 | Bae et al. | | |

\* cited by examiner

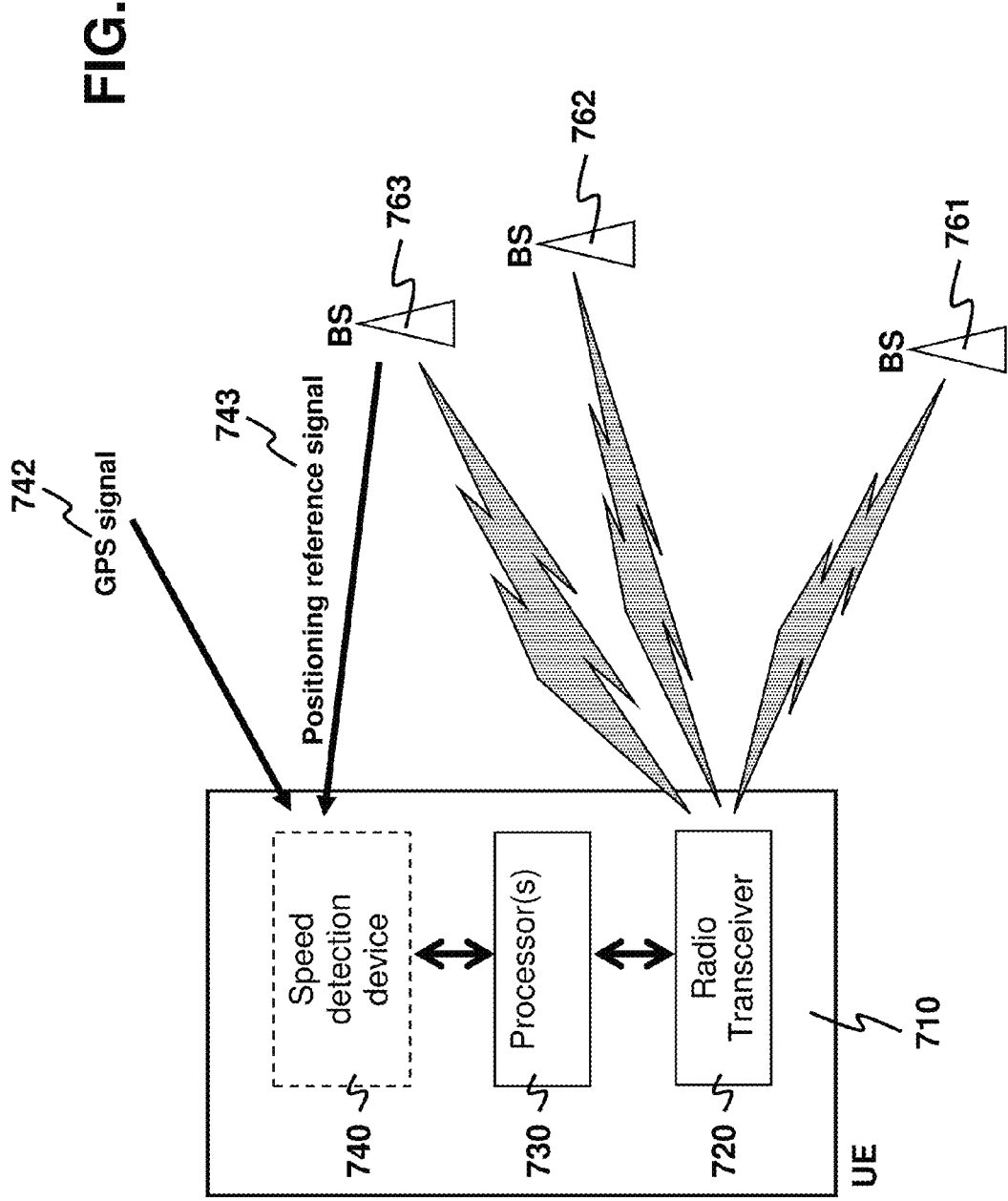

BASE STATION SELECTION IN ULTRA DENSE NETWORK HANDOVER SCENARIOS

FIELD OF THE INVENTION

The present invention generally relates to a handover process in a mobile communication system. In particular, the present invention relates to a technique for selecting a preferred base station (BS) from plural candidate BSs for a user equipment (UE) to switch to. The technique is especially useful for performing handover in an ultra dense network (UDN) where the candidate BSs have highly-overlapped cell coverages.

BACKGROUND

In recent years, there has been a tremendous growth in mobile data traffics. Furthermore, this trend is expected to continue in the near future. To cope with this growth, dense transmission points, e.g., UDNs, need to be deployed. In particular, an UDN having a number of small cells having similar cell ranges and highly overlapped coverages is advantageous in dramatically increasing the system capacity, together with other advantages. Despite a number of advantages, ultra-dense small cell deployment also poses many challenges. Owing to highly-overlapped cell coverage, handover candidate BSs have similar received signal strength (RSS) values measured at a UE. In addition, there are a large number of such candidate BSs. Frequent occurrence of handover thus arises. Since frequent occurrence of handover causes high overhead or call drop issues, a proper handover management system has to be developed in order to address these issues. It is desirable to select a preferred BS whenever a handover is required such that the total number of handover events over a given time duration can be kept minimal or reduced. Efforts for selecting the preferred BS in order to lower the number of handover events include the following techniques.

In CN1889770A, the preferred BS is determined to be a BS based on determining whether the UE is approaching or leaving this BS. Whether the UE is approaching the BS is determined by first-order differences of (a) a received signal quality such as a SNR or an error rate, and (b) a time delay of signal arrival. The preferred BS is determined to be the BS that is considered by checking the first-order differences with predefined thresholds. Only the BS with a positive first-order difference, which means the UE is currently approaching the BS instead of leaving the BS, is chosen as a preferred BS. However, there are some drawbacks. First, fine synchronization and signal demodulation for all BSs under consideration are required. Second, threshold configuration is case-specific, and is difficult to find a universal threshold. Third, the use of first-order differences only provides coarse grouping or classification of the BSs. The preferred BS that is identified may not be the most desirable one in minimizing the number of handover events.

In US2009303891, the preferred BS is determined by considering RSS values, first-order differences thereof and Doppler frequency as prioritizing/weighting factors. Nevertheless, more measurement and estimation effort is required for this technique. Because of using first-order differences only, this technique also suffers from the same drawback of the technique of CN1889770A in that only coarse grouping of the BSs under consideration results.

In U.S. Pat. No. 8,934,906B2, a method for determining whether a train is approaching or leaving a candidate BS is suggested for subsequently determining a preferred BS. The train is installed with a relay BS on board. Periodic measurements on a time of arrival, a frequency offset, a Doppler frequency, a RSS value, or a combination thereof, are performed by the relay BS. A preferred BS that the relay BS is advantageous to switch to is identified if the increasing rate of the signal quality revealed from the periodic measurements exceeds a threshold. There are several drawbacks regarding this technique, however. First, periodic measurements are not practicable for an ordinary UE such as a smartphone, which is often battery-power-limited. Second, threshold configuration may be case-specific and difficult to find a universal threshold. Third, this technique also inherits the drawback of other aforementioned techniques in that only coarse grouping of the BSs is resulted due to consideration of first-order differences only.

There is a need in the art to have an improved technique over existing techniques for selecting a preferred BS from a list of candidate BSs in order to lower the number of handover events without excessive implementation complexity.

SUMMARY OF THE INVENTION

An aspect of the present invention is to provide a method for selecting, by a UE, a preferred BS from plural candidate BSs for the UE to switch to in a handover process.

In the method, a time-ordered sequence of RSS values of a signal sent from an individual candidate BS and received at the UE is obtained, where the obtained RSS values are equally time-spaced. A plurality of finite differences for the individual candidate BS is computed. The plurality of finite differences consists of a first-order difference, a second-order difference, and one or more higher-order differences, computed according to the time-ordered sequence of RSS values obtained for the individual candidate BS. A preference level for the individual candidate BS is also computed. The preference level is a total number of any finite difference or finite differences identified in the plurality of finite differences, such that the identified finite difference or identified finite differences have consecutive order numbers, include the first-order difference, and are either positive or non-negative. The obtaining of the RSS-value sequence, the computing of the plurality of finite differences and the computing of the preference level are repeated for each of the candidate BSs. The method further comprises identifying one or more favorable candidate BSs from the candidate BSs such that the one or more favorable candidate BSs have a same preference level that is maximum among all of the preference levels computed for the candidate BSs. The preferred BS is selected from the one or more favorable candidate BSs.

In one embodiment, the number of finite differences in the plurality of finite differences for each of the candidate BSs is three.

The time-ordered sequence obtained for the individual candidate BS has a lastly-obtained RSS value. Preferably, the preferred BS is selected such that the preferred BS has the lastly-obtained RSS value that is maximum among all of the lastly-obtained RSS values obtained for the one or more favorable candidate BSs.

Before a sub-process of selecting the preferred BS according to the method is initiated in the handover process, the UE may select the candidate BSs from a list of potential BSs according to a traveling speed of the UE as well as a cell type of each of the potential BS. The cell type of an individual potential BS at least enables the UE to determine whether the individual potential BS is a small cell and whether the individual potential BS is a macrocell. Preferably, the candidate BSs are selected to be plural small cells when the traveling speed is less than a pre-determined speed, and otherwise to be plural macrocells.

The method is implementable in a UE comprising a radio transceiver and one or more processors.

Other aspects of the present invention are disclosed as illustrated by the embodiments hereinafter.

BRIEF DESCRIPTION OF THE DRAWINGS

FIG. 7 depicts a UE and a plurality of BSs for illustrating implementation of the disclosed method at the UE.

DETAILED DESCRIPTION

Herein in the specification and the appended claims, a "higher-order difference" specifically means a finite difference having an order J where J is an integer equal to or greater than 3. Therefore, a first-order difference or a second-order difference is not a higher-order difference, whereas a third-order difference is.

As used herein, a "user equipment" (i.e. UE) is a mobile communication device or a mobile station that wirelessly communicates with a BS in a mobile communication system for data transmission. A UE may be a mobile computing device such as a smart phone or a notebook computer.

The present invention is especially advantageous for use in a mobile communication system that is an UDN comprising a number of small cells having similar cell ranges and highly overlapped coverages. However, the present invention is not limited only to applications in the UDN. The present invention is applicable to a general mobile communication system.

The inventors have made the following analysis and the analysis results have led to the development of the present invention.

Figure 1:
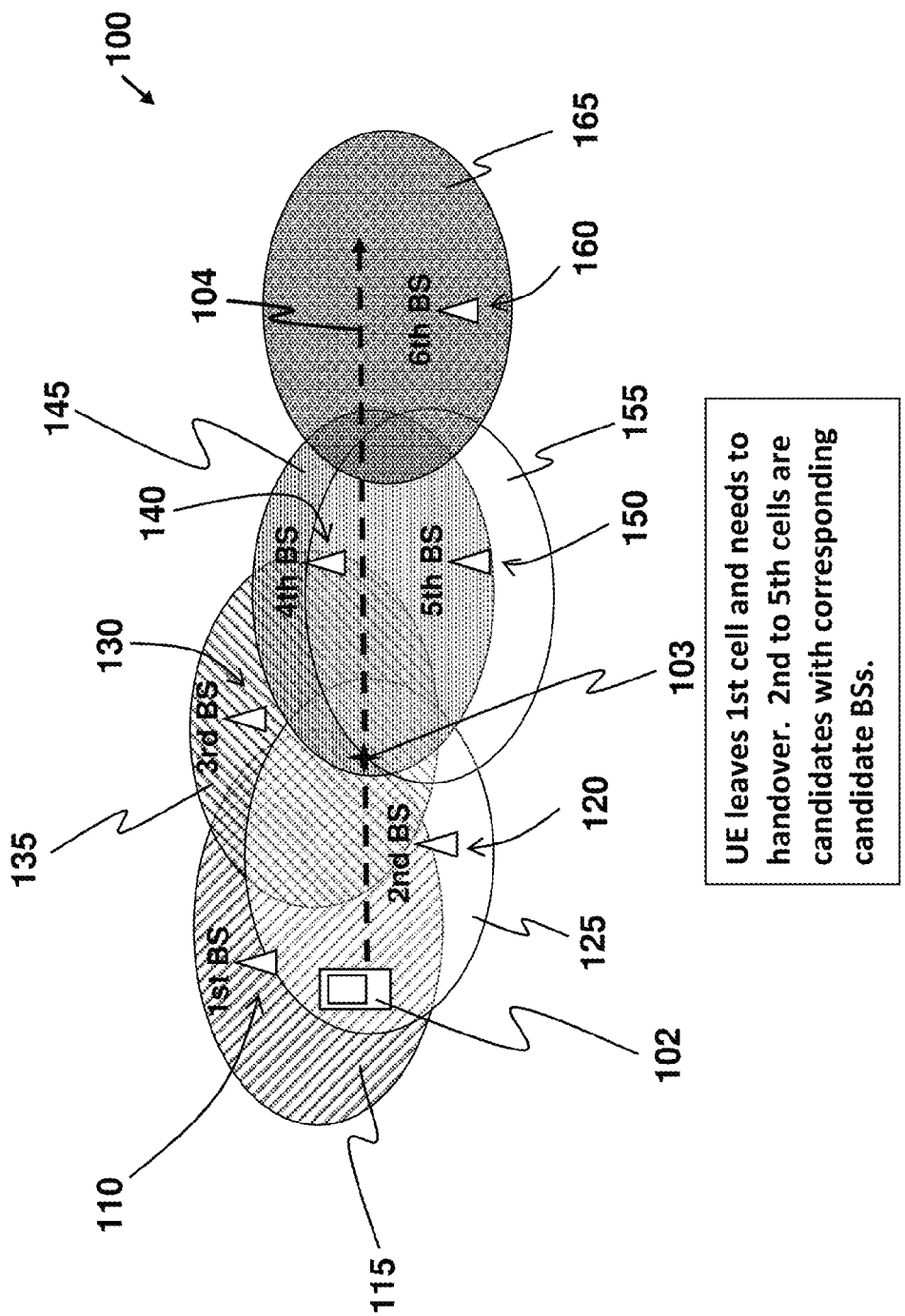
FIG. 1 depicts a typical UDN having a plurality of highly-overlapped cells for consideration in an analysis that leads to the present invention.

FIG. 1 depicts a typical UDN as a representative situation considered in the analysis that follows. An UDN 100 comprises a first BS 110, a second BS 120, a third BS 130, a fourth BS 140, a fifth BS 150 and a sixth BS 160 for providing radio access to a UE 102 in a first cell 115, a second cell 125, a third cell 135, a fourth cell 145, a fifth cell 155 and a sixth cell 165, respectively. Note that the six cells 115, 125, 135, 145, 155, 165 have highly-overlapped cell coverages. Consider the case that the UE 102 follows a traveling trajectory 104 and is leaving the first cell 115 at a location 103. A handover event is triggered. The second cell 125, the third cell 135, the fourth cell 145 and the fifth cell 155 (all providing coverage for the UE 102 at the time instance) are candidate cells, one of which is to be selected by the UE 102 to switch to.

Figure 2:
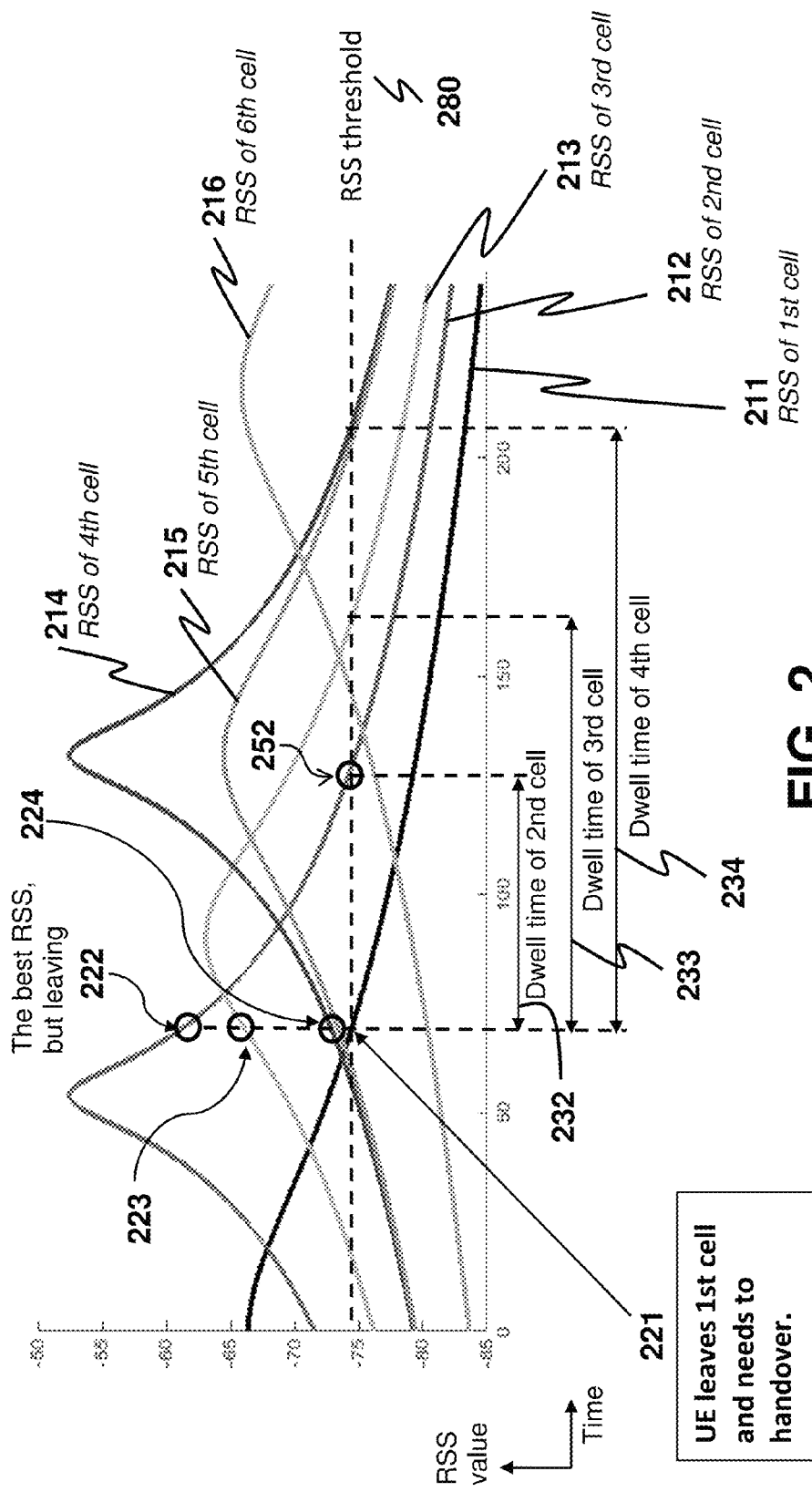
FIG. 2 plots the RSS values for signals sent from BSs in the UDN of FIG. 1, revealing the relationship between a dwell time of each BS and the shape of RSS curve thereof.

To illustrate the handover event, FIG. 2 plots RSS values 211, 212, 213, 214, 215, 216 against time for signals sent from the six BSs 110, 120, 130, 140, 150, 160, respectively, and received at the UE 102. When the RSS value 211 for the first BS 110 crosses and drops below a pre-defined RSS threshold 280 (as indicated by a first coordinate 221 of FIG. 2), i.e. when the UE 102 reaches the location 103 on the traveling trajectory 104, the handover event is triggered, prompting the UE 102 to measure the RSS values 212-215 for the signals from the second BS 120, the third BS 130, the fourth BS 140 and the fifth BS 150.

Conventionally, a BS having the highest RSS value among all candidate BSs is selected by the UE 102 for switching to in the handover event. As shown in FIG. 2, signals sent from the second BS 120, the third BS 130 and the fourth BS 140 have RSS values indicated at a second coordinate 222, a third coordinate 223 and a fourth coordinate 224, respectively. It is apparent that the second BS 120 is to be selected as a next BS for the UE 102 to switch to. However, FIG. 2 shows that the UE 102 is leaving the second cell 125, shortening the time of triggering a next handover (the handover being indicated as a fifth coordinate 252). The strategy of selecting the BS having the highest RSS value is not advantageous for the UDN 100 in minimizing the number of occurrences of handover events.

To minimize the number of occurrences of handover events, it is desirable to select a BS such that a time duration that the UE 102 is served by this BS before a next handover event is triggered is the maximum among such time durations estimated for all candidate BSs. Denote a dwell time for a BS under consideration as the time duration that a UE stays in a cell covered by the considered BS. The dwell time is the time interval between successive handover events, and is the time span over which the RSS value for the considered BS is above a certain threshold (e.g., the RSS threshold 280). As shown in FIG. 2, a first dwell time 232 for the second BS 120 is less than a second dwell time 233 for the third BS 130, and the second dwell time 233 is in turn less than a third dwell time 234 for the fourth BS 140. It indicates that the fourth BS 140 gives the longest dwell time, and is the most advantageous BS for the UE 102 to switch to under a strategy of maximizing a dwell time.

Examining the aforementioned three dwell times 232, 233, 234 with the three (bell-shaped) curves plotted for the RSS values 212, 213, 214 (respectively for the second BS 120, the third BS 130 and the fourth BS 140) reveals the following key result. To maximize a dwell time is to select, by a UE, a BS among candidate BSs such that (1) the UE is traveling in a direction to approach the selected BS, and (2) the peak of "the bell-shaped curve" for the selected BS is, among the candidate BSs, farthest in distance away from the location at which a handover event occurs. The inventors have found the following method to identify such BS.

Figure 3:
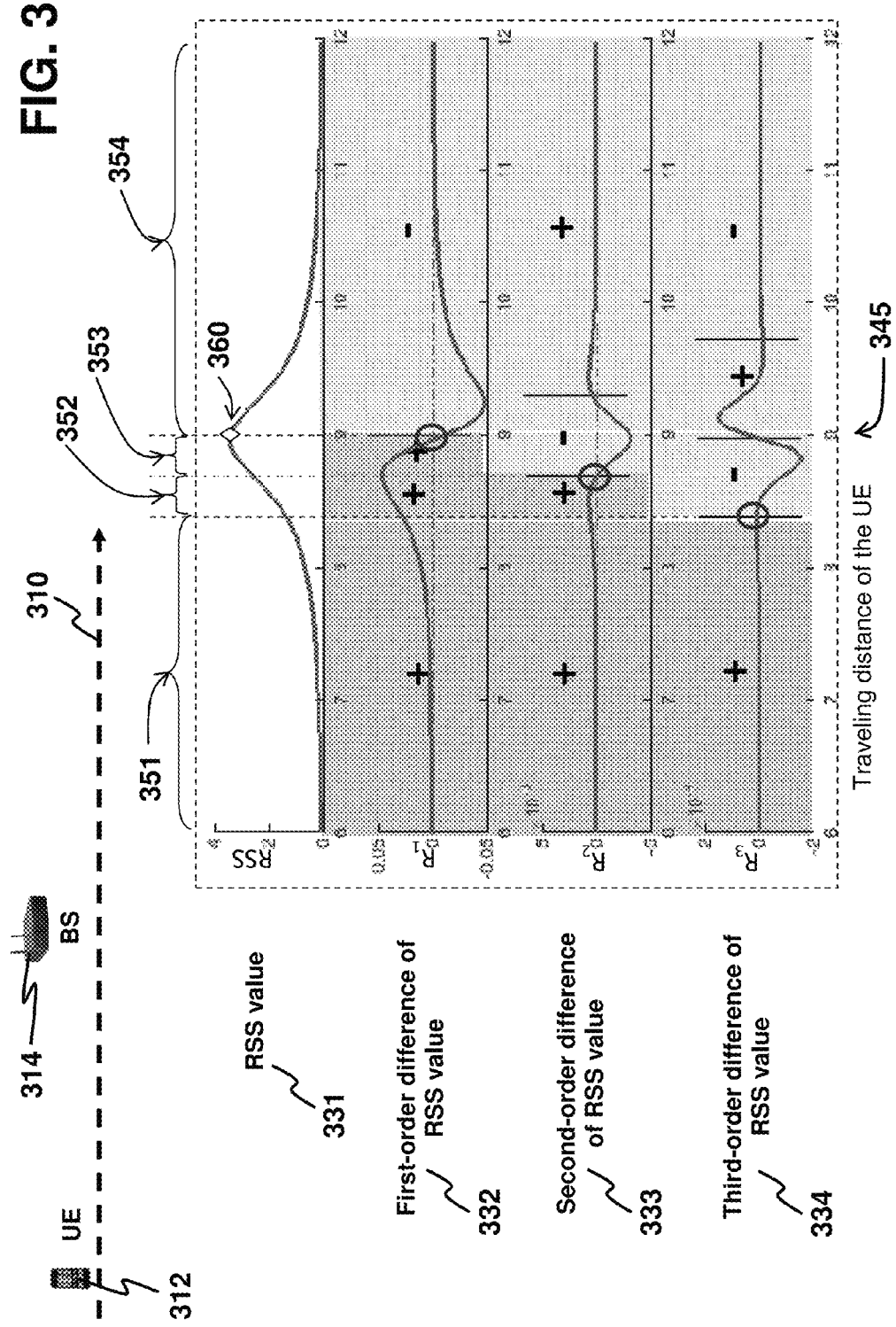
FIG. 3 plots a RSS value and finite differences thereof over a traveling distance that a UE approaches and then leaves a BS, indicating that the total number of consecutive finite differences that are positive (or non-negative) and that start from the first-order difference is usable in identifying a preferred BS for the UE to switch to in a handover event.

FIG. 3 plots a RSS value 331 and finite differences thereof against a traveling distance 345 of a UE 312 on a traveling path 310 for investigating a scenario of the UE 312 approaching and leaving a BS 314. The aforesaid finite differences include a first-order difference 332, a second-order difference 333 and a third-order difference 334 of the RSS value 331. A marker 360 on the plotted curve of the RSS value 331 indicates a special situation that the UE 312 is closest to the BS 314 on the path 310, such that when the UE 312 is located on the path 310 with the traveling distance 345 on the left of the marker 360, the UE 312 is approaching the BS 314. The whole range of the traveling distance 345 is partitioned into a first region 351, a second region 352, a third region 353 and a fourth region 354. It is apparent that the first, second and third regions 351, 352, 353 have the UE 312 approaching the BS 314, whereas the UE 312 is leaving the BS 314 in the fourth region 354. For the traveling distance 345 within the first region 351, the first-order difference 332, the second-order difference 333 and the third-order difference 334 are positive. In the second region 352, the first-order difference 332 and the second-order difference 333 are positive but the third-order difference 334 is negative. The third region 353 and the fourth region 354 are similarly defined. It is also apparent that the UE 312 when it is in the first region 351 is farther away from the BS 314 than when it is in the second region 352 or the third region 353. It follows that a plurality of candidate BSs can be prioritized according to the number of consecutive finite differences starting from the first-order difference of a RSS value and being positive (or being non-negative as an obvious alternative selection criterion). The candidate BSs are grouped into different groups where each group has one or more BSs having the same number of such consecutive finite differences. The most-advantageous group is the one having the number of consecutive finite differences the maximum among all the groups. Then a preferred BS for the UE to switch to in handover is selected from the most-advantageous group. In the aforementioned approach, only the signs of finite differences are used in selecting the preferred BS, so that advantageously, implementation of the approach is made simple. The aforementioned approach is used in the present invention that is detailed as follows.

An aspect of the present invention is to provide a method for selecting, by a UE, a preferred BS from plural candidate BSs for the UE to switch to in a handover process.

Figure 4:
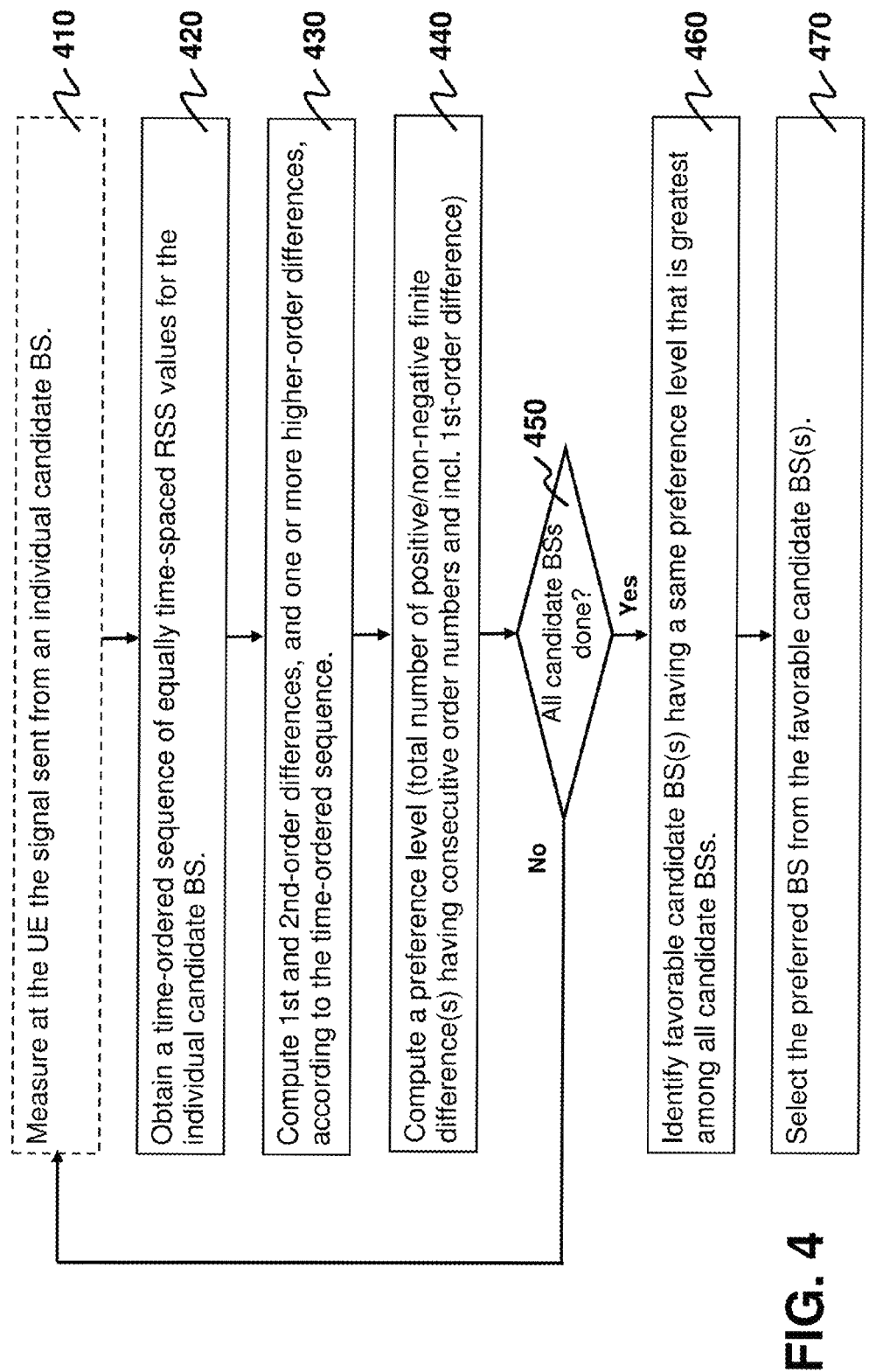
FIG. 4 depicts a flowchart for illustrating a method for selecting the preferred BS in accordance with an exemplary embodiment of the present invention.

The method is exemplarily illustrated with an aid of FIG. 4, which depicts a flowchart of steps for selecting the preferred UE in accordance with an exemplarily embodiment of the present invention. Let L be the number of the candidate BSs.

In a step 420, the UE obtains a time-ordered sequence of RSS values of a signal sent from an individual candidate BS and received at the UE. The sequence is time-ordered in a sense that the obtained RSS values are obtained at different time instants and are arranged in an order of time. Furthermore, it is required that the obtained RSS values are equally time-spaced, since the RSS values are subsequently used to compute a plurality of finite differences. Without loss of generality, consider that the individual candidate BS is the l th candidate BS, $l \in \{1, 2, \ldots, L\}$. The UE obtains the time-ordered sequence, $\{S\{k_l;l\}|k_l=1, 2, \ldots, K_l\}$, where $S\{k_l;l\}$ is the RSS value obtained for the l th candidate BS at the $k_l$ th time instant, and $K_l$ is the total number of such RSS values that are obtained.

In a step 430, a plurality of finite differences for the individual candidate BS is computed. The plurality of finite differences consists of a first-order difference, a second-order difference, and one or more higher-order differences, computed according to the time-ordered sequence of RSS values obtained for the individual candidate BS. It follows that for the l th candidate BS, the UE obtains $R_1(k'_l;l)=S(k'_l;l)-S(k'_l-1;l)$, $R_2(k'_l;l)=R_1(k'_l;l)-R_1(k'_l-1;l)$,

. . .

$R_N(k'_l;l)=R_{N-1}(k'_l;l)-R_{N-1}(k'_l-1;l)$, where: $R_n(k'_l;l)$ is the n th-order difference computed for the l th candidate BS and obtained for a pre-determined value of time index $k'_l$, $n \in \{1, 2, \ldots, N\}$ being an order number; and $N \geq 3$ is the highest order number in the computation of the plurality of finite differences. Note that N is independent of l and is the same for all the L candidate BSs. In one option, N=3 is used. This choice of N provides a balance between the computation effort required by the UE and the chance of correctly predicting that the preferred BS to be identified can maximize the dwell time. Preferably, $k'_l$ is selected to be $K_l$ in that it is advantageous to compute the plurality of finite differences for a lastly-obtained RSS value in the time-ordered sequence in order that the obtained finite differences reflect the latest situation.

After the plurality of finite differences is obtained, the UE computes a preference level for the individual candidate BS in a step 440. The preference level is a total number of any finite difference or finite differences identified in the plurality of finite differences, where the identified finite difference or identified finite differences have consecutive order numbers, include the first-order difference, and are either positive or non-negative. In the special case that the first-order difference is negative, the preference level is equal to zero. The preference level indicates a degree of possibility in having a long dwell time. A higher value of the preference level implies that the individual candidate BS under consideration is predicted to be more likely in having a long dwell time. The preference level for the l th candidate BS, denoted as $p_l$, is computed by $$p_l \begin{cases} 0 & \text{if } R_1(k'_l; l) \leq 0 \\ \underset{n' \in \{1,2,\ldots,N\}}{\operatorname{argmax}} (R_n(k'_l; l) > 0 \mid n = 1, 2, \ldots, n') & \text{otherwise} \end{cases}$$

or $$p_l \begin{cases} 0 & \text{if } R_1(k'_l; l) < 0 \\ \underset{n' \in \{1,2,\ldots,N\}}{\operatorname{argmax}} (R_n(k'_l; l) \geq 0 \mid n = 1, 2, \ldots, n') & \text{otherwise} \end{cases}$$

depending on whether being positive or being non-negative is used as a selection criterion.

The steps 420, 430 and 440 are repeated for each of the L candidate BSs (step 450), thereby obtaining values of $p_l$, $l=1, 2, \ldots, L$. In repeating the steps 420, 430 and 440, one practical choice in parameter setting is to have the same value of $K_l$ for all the L candidate BSs.

After the preference levels for the candidate BSs are computed, one or more favorable candidate BSs are identified from the candidate BSs in a step 460 such that the one or more favorable candidate BSs have a same preference level that is maximum among all of the preference levels computed for the candidate BSs. Let $G_{favorable}$ be an index set of the one or more favorable candidate BSs. Then $G_{favorable}$ is given by $G_{favorable}=\{l'|p_{l'} \geq p_l \text{ for all } l=1,2,\ldots,L\}$.

The preferred BS is selected from the one or more favorable candidate BSs in a step 470. Although it is possible to have different strategies in selecting the preferred BS from the one or more favorable candidate BSs, advantageously the preferred BS may be selected to be the one that provides the highest RSS value measured at the UE among the one or more favorable candidate BSs. In one embodiment, the time-ordered sequence obtained for the individual candidate BS has a lastly-obtained RSS value, and the preferred BS is selected such that the preferred BS has the lastly-obtained RSS value that is maximum among all of the lastly-obtained RSS values obtained for the one or more favorable candidate BSs.

There are some additional issues for consideration in practical implementation of the disclosed method.

Before the time-ordered sequence for the individual candidate BS is obtained in the step 420, the UE performs physical measurement on the signal sent from the individual candidate BS in a step 410. In general, it is often that the signal is measured at a plurality of measurement time instants not coinciding with the set of time instants in obtaining the equally time-spaced RSS values in the step 420. Therefore, in the step 410, the signal is first physically measured at the plurality of measurement time instants to obtain a discrete-time sequence of measured RSS values. Then in executing the step 420, include processing the discrete-time sequence of measured RSS values obtained for the individual candidate BS by a signal-processing algorithm to yield the equally time-spaced RSS values. The signal-processing algorithm usually includes interpolation to obtain the equally time-spaced RSS values from the discrete-time sequence of measured RSS values.

Refer to FIG. 3. In the investigation made above, the variation of the RSS value 231 when the UE 312 travels along the path 310 reflects the path loss experienced by the signal sent from the BS 340. In radio propagation, the path loss is superimposed on fast fading. It follows that a number of consecutive measured RSS values need to be averaged in order to remove the effect of fast fading on the path loss. Hence, the aforementioned signal-processing algorithm preferably includes a step of averaging a pre-determined number of consecutive measured RSS values to yield an average RSS sample. The averaging step is repeated to process different groups of consecutive measured RSS values in the discrete-time sequence of measured RSS values so as to obtain a sequence of average RSS samples for generating the equally time-spaced RSS values in the step 420.

As mentioned above, preferably the signal-processing algorithm further includes a step of interpolating the sequence of average RSS samples to give the time-ordered sequence of equally time-spaced RSS values.

Depending on practical implementation, those skilled in the art may include other steps in the signal-processing algorithm. Examples of such steps include a filtering step for reducing noise in the discrete-time sequence of measured RSS values, and a non-linear filtering step for removing outliers in the sequence.

In the step 410, the physical measurement is usually done by a transceiver module of the UE. Usually, the transceiver module returns a RSS that is a numeric value associated with a unit of dBm rather than in unit of watt (W). Therefore, the RSS usually indicates a power level in the logarithmic domain. The present invention is applicable to the case that the numeric value of RSS in unit of dBm is directly treated as the value of $S\{k_i;l\}$, as well as to another case that the RSS in unit of W is used for $S\{k_i;l\}$.

Optionally, all the L time-ordered sequences obtained for the L candidate BSs in the step 450 are mutually time-aligned in a sense that (1) $K_1=K_2=\ldots=K_L$, and (2) the k th time instants of obtaining the $S\{k_i;l\}$ values, l=1, 2, ..., L, are the same for any k ∈ $\{1, 2, \ldots, K_L\}$. Hence, the lastly-obtained RSS values obtained for the one or more favorable candidate BSs are obtained at the same time instant, allowing the selection of the preferred BS among the one or more favorable candidate BSs to be straightforward when implemented in the step 470. Nevertheless, it is not necessary that the L time-ordered sequences are time-aligned in all cases. In case the UE moves slowly, the power of the signal sent from the individual candidate BS does not vary considerably over a short time interval during performing the step 420 such that a time-alignment requirement among all the candidate BSs does not result in material difference in identifying the one or more favorable candidate BSs in the step 460. Skipping the time-alignment requirement reduces computation effort that is otherwise required to perform extra interpolation by the UE.

Figure 5:
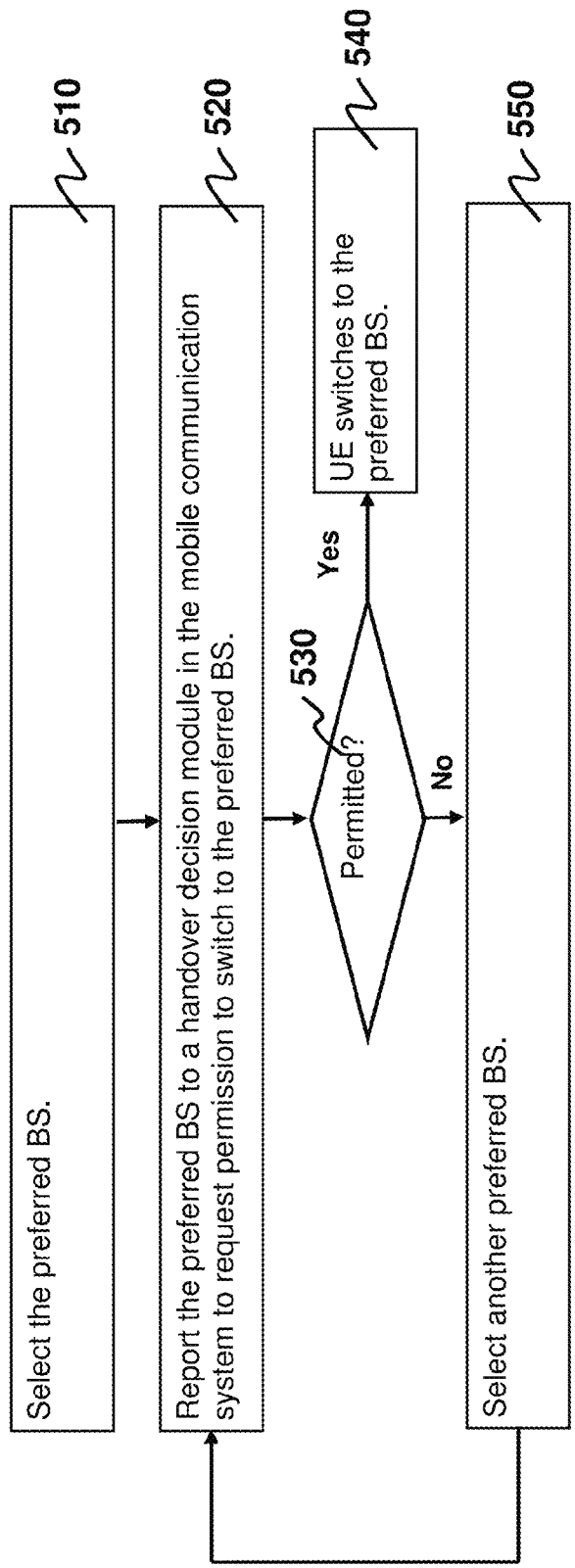
FIG. 5 depicts a flowchart for illustrating a handover process based on the preferred BS selected according to an embodiment of the selecting method of the present invention.

As mentioned above, the disclosed method for selecting the preferred BS is used in the handover process. FIG. 5 depicts one example of the handover process. In a handover process, a preferred BS is selected by a UE in a step 510 according to an embodiment of the selecting method disclosed above. The UE then reports the preferred BS to a handover decision module in the mobile communication system for requesting permission of switching to the preferred BS in a step 520. In case a permission is granted (step 530), the UE switches to the preferred BS in a step 540. Otherwise, another preferred BS is selected in a step 550, and the step 520 is repeated. In the step 550, it may be helpful to classify the L candidate BSs into different non-overlapping groups where each group contains any one or more candidate BSs having a same preference level. For example, the non-overlapping groups are identified by constructing N+1 index sets $G_j$, j=0, 1, ..., N, where $G_j=\{l|p_l=j\}$. Note that $G_{favorable}=G_{j'}$ for a certain j' such that $G_{j'}\neq\phi$ and $G_i=\phi$ for i>j', $\phi$ being an empty set. If all the one or more favorable candidate BSs (residing in the most-advantageous group) are not accepted by the handover decision module, then candidates BS(s) in the next most-advantageous group having the same preference level just less than the preference level in the most-advantageous group are considered.

Figure 6:
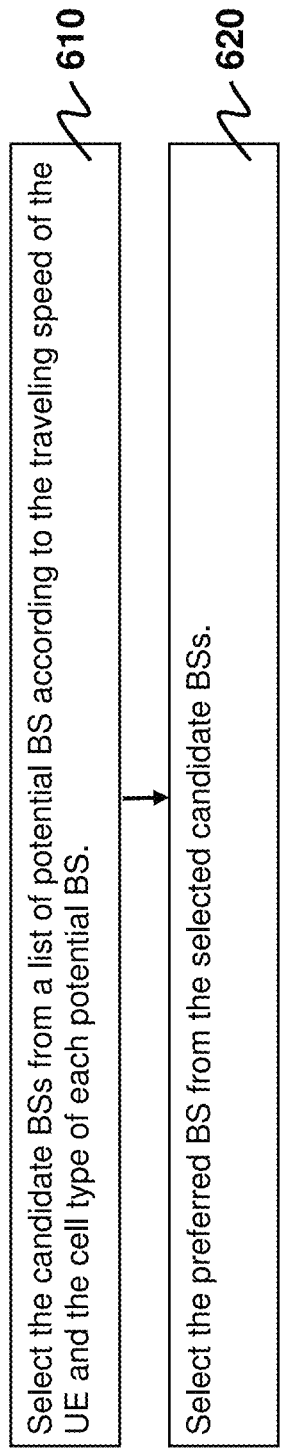
FIG. 6 depicts, in accordance with one embodiment of the present invention, a flowchart for illustrating a handover process with selecting candidate BSs from a list of potential BSs, such handover process having an advantage for use in a heterogeneous network comprising small cells and macrocells.

The method disclosed above has been predominantly targeted to an application to a UDN comprising a number of small cells having similar cell ranges and highly overlapped coverages. The disclosed method is also applicable to a heterogeneous network comprising small cells and macrocells where each of the small cells has a radio coverage partially or entirely overlaps on a greater radio coverage offered by one of the macrocells. FIG. 6 depicts, in accordance with one embodiment of the present invention, a flowchart illustrating a handover process performed by a UE in a heterogeneous network. In the handover process, a preferred BS is selected from plural candidate BSs for the UE to switch to according to any of the above-disclosed embodiments of the method for selecting the preferred BS (step 620). Before the step 620 is performed, the candidate BSs are first selected from a list of potential BSs according to a traveling speed of the UE as well as a cell type of each of the potential BS (step 610). The cell type of an individual potential BS at least enables the UE to determine whether the individual potential BS is a small cell and whether the individual potential BS is a macrocell. When the traveling speed of the UE is high, it is more desirable to be handed over to one of the macrocells; otherwise, switching to a small cell would trigger another handover event in a short time. Conversely, it is more desirable to switch to one of the small cells when the traveling speed of the UE is low.

Summing up, the candidate BSs are selected to be plural small cells when the traveling speed is less than a predetermined speed, and otherwise to be plural macrocells. Note that in practice, determination of the traveling speed of the UE is feasible if, for example, the UE is equipped with a Global Positioning System (GPS) receiver to identify locations of the UE over time.

FIG. 7 depicts a system comprising a UE and a plurality of BSs for illustrating implementation of the method for selecting a preferred BS at the UE. A UE 710 comprises a radio transceiver 720 for providing wireless connectivity to the UE 710, and one or more processors 730 for performing control and computation functions. In particular, the radio transceiver 720 is used for wirelessly communicating with a plurality of BSs 761-763. The radio transceiver 720 has a RSS measurement unit for measuring RSSs of signals sent from any of the BSs 761-763. It is obvious to those skilled in the art that the step 410 is performed by the radio transceiver 720 while the one or more processors 730 are configured to execute the steps 420, 430, 440, 450, 460 and 470. The one or more processors 730 are further configured to control the radio transceiver 720 to perform the step 410. Optionally, the UE 710 further includes a speed detection device 740 for determining a traveling speed of the UE 710. The speed detection device 740 may determine the speed of the UE 710 by means of, for example, measurements made by an inertial sensor equipped at the UE 710, a GPS signal 742, or a positioning reference signal 743 sent from, say, the BS 763.

The one or more processors 730 may be realized using general purpose or specialized computing devices, computer processors, computing servers, or electronic circuitries including but not limited to digital signal processors (DSP), application specific integrated circuits (ASIC), field programmable gate arrays (FPGA), and other programmable logic devices.

Furthermore, each embodiment of the method disclosed above is implementable in a UE configured to be compliant to a Long Term Evolution (LTE) specification or a LTE-Advanced specification.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. In a handover process, a method for selecting, by a user equipment (UE), a preferred base station (BS) from plural candidate BSs for the UE to switch to, the method comprising:
    obtaining a time-ordered sequence of received signal strength (RSS) values of a signal sent from an individual candidate BS and received at the UE, wherein the obtained RSS values are equally time-spaced;
    computing a plurality of finite differences for the individual candidate BS, wherein the plurality of finite differences consists of a first-order difference, a second-order difference, and one or more higher-order differences, computed according to the time-ordered sequence of RSS values obtained for the individual candidate BS;
    computing a preference level for the individual candidate BS, wherein the preference level is a total number of any finite difference or finite differences identified in the plurality of finite differences, and wherein the identified finite difference or identified finite differences have consecutive order numbers, include the first-order difference, and are either positive or non-negative;
    repeating the obtaining of the RSS-value sequence, the computing of the plurality of finite differences and the computing of the preference level for each of the candidate BSs;
    identifying one or more favorable candidate BSs from the candidate BSs such that the one or more favorable candidate BSs have a same preference level that is maximum among all of the preference levels computed for the candidate BSs; and
    selecting the preferred BS from the one or more favorable candidate BSs.

2. The method of claim 1, wherein the time-ordered sequence obtained for the individual candidate BS has a lastly-obtained RSS value, and the preferred BS is selected such that the preferred BS has the lastly-obtained RSS value that is maximum among all of the lastly-obtained RSS values obtained for the one or more favorable candidate BSs.

3. A user equipment (UE) comprising one or more processors configured to execute, in a handover process, a sub-process of selecting a preferred base station (BS) from plural candidate BSs for the user equipment to switch to, wherein the sub-process is arranged according to the method of claim 2.

4. The method of claim 1, wherein the number of finite differences in the plurality of finite differences for each of the candidate BSs is three.

5. A user equipment (UE) comprising one or more processors configured to execute, in a handover process, a sub-process of selecting a preferred base station (BS) from plural candidate BSs for the user equipment to switch to, wherein the sub-process is arranged according to the method of claim 4.

6. The method of claim 1, wherein the time-ordered sequences obtained for the candidate BSs are mutually time-aligned.

7. The method of claim 1, further comprising:
    physically measuring the signal sent from the individual candidate BS at a plurality of measurement time instants to obtain a discrete-time sequence of measured RSS values;
wherein the obtaining of the time-ordered sequence of RSS values of the signal sent from the individual candidate BS and received at the UE comprises:
    processing the discrete-time sequence of measured RSS values obtained for the individual candidate BS by a signal-processing algorithm to yield the equally time-spaced RSS values in the time-ordered sequence for the individual candidate BS.

8. The method of claim 7, wherein the signal-processing algorithm includes:
    a step of averaging a pre-determined number of consecutive measured RSS values to yield an average RSS sample; and
    repeating the averaging step to process different groups of consecutive measured RSS values in the discrete-time sequence of measured RSS values so as to obtain a sequence of average RSS samples for generating the equally time-spaced RSS values.

9. The method of claim 8, wherein the signal-processing algorithm further includes:

a step of interpolating the sequence of average RSS samples to give the time-ordered sequence of equally time-spaced RSS values.

10. A method for performing a handover process by a user equipment (UE), comprising:
a sub-process of selecting a preferred base station (BS) from plural candidate BSs for the UE to switch to according to the method of claim 1; and
reporting the preferred BS to a handover decision module in the mobile communication system for requesting permission of switching to the preferred BS.

11. A method for performing a handover process by a user equipment (UE), comprising:
a sub-process of selecting a preferred base station (BS) from plural candidate BSs for the UE to switch to according to the method of claim 1; and
classifying the candidate BSs into a plurality of non-overlapping groups each containing any one or more candidate BSs having a same preference level.

12. A method for performing a handover process by a user equipment (UE), comprising:
a sub-process of selecting a preferred base station (BS) from plural candidate BSs for the UE to switch to according to the method of claim 1; and
before the sub-process is initiated, selecting the candidate BSs from a list of potential BSs according to a traveling speed of the UE as well as a cell type of each of the potential BS, wherein the cell type of an individual potential BS at least enables the UE to determine whether the individual potential BS is a small cell and whether the individual potential BS is a macrocell.

13. The method of claim 12, wherein the candidate BSs are selected to be plural small cells when the traveling speed is less than a pre-determined speed, and otherwise to be plural macrocells.

14. A user equipment (UE) comprising one or more processors configured to execute, in a handover process, a sub-process of selecting a preferred base station (BS) from plural candidate BSs for the user equipment to switch to, wherein the sub-process is arranged according to the method of claim 1.

15. The UE of claim 14, wherein the UE is configured to be compliant to a Long Term Evolution (LTE) specification or a LTE-Advanced specification.

16. The UE of claim 14, wherein the one or more processors are further configured to:
before the sub-process is initiated, select the candidate BSs from a list of potential BSs according to a traveling speed of the UE as well as a cell type of each of the potential BS, wherein the cell type of an individual potential BS at least enables the UE to determine whether the individual potential BS is a small cell and whether the individual potential BS is a macrocell.

17. The UE of claim 16, wherein the candidate BSs are selected to be plural small cells when the traveling speed is less than a pre-determined speed, and otherwise to be plural macrocells.

18. A user equipment (UE) comprising one or more processors, and a radio transceiver for providing wireless connectivity to the UE, wherein the one or more processors are configured to:
execute, in a handover process, a sub-process of selecting a preferred base station (BS) from plural candidate BSs for the user equipment to switch to according to the method of claim 1;
control the radio transceiver to physically measure the signal sent from the individual candidate BS at a plurality of measurement time instants so as to obtain a discrete-time sequence of measured RSS values; and
in the obtaining of the time-ordered sequence of RSS values of the signal sent from the individual candidate BS and received at the UE, process the discrete-time sequence of measured RSS values obtained for the individual candidate BS by a signal-processing algorithm to yield the equally time-spaced RSS values in the time-ordered sequence for the individual candidate BS.

19. The UE of claim 18, wherein the signal-processing algorithm includes:
a step of averaging a pre-determined number of consecutive measured RSS values to yield an average RSS sample; and
repeating the averaging step to process different groups of consecutive measured RSS values in the discrete-time sequence of measured RSS values so as to obtain a sequence of average RSS samples for generating the equally time-spaced RSS values.

20. The UE of claim 19, wherein the signal-processing algorithm further includes:
a step of interpolating the sequence of average RSS samples to give the time-ordered sequence of equally time-spaced RSS values.

* * * * *